United States Patent
Alwan et al.

(10) Patent No.: US 9,120,507 B1
(45) Date of Patent: Sep. 1, 2015

(54) SYSTEM FOR ORIENTING FRONT WHEEL OF VEHICLE DURING OFFSET FRONTAL IMPACT

(71) Applicant: Ford Global Technologies, LLC, Dearborn, MI (US)

(72) Inventors: Jamil M. Alwan, Ann Arbor, MI (US); Jonatan LeffYaffe, Mexico City (MX); Djamal Eddine Midoun, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/288,257

(22) Filed: May 27, 2014

(51) Int. Cl.
  B62D 21/15 (2006.01)
  B60R 19/34 (2006.01)

(52) U.S. Cl.
  CPC .............. B62D 21/152 (2013.01); B60R 19/34 (2013.01)

(58) Field of Classification Search
  USPC ............. 280/784; 180/274; 296/180.1, 180.5; 293/102, 58, 120, 118, 119, 124, 132, 293/150
  See application file for complete search history.

(56) References Cited

U.S. PATENT DOCUMENTS

| | | | |
|---|---|---|---|
| 3,823,968 A * | 7/1974 | Barenyi | 293/131 |
| 3,843,180 A * | 10/1974 | Alexander | 293/150 |
| 4,251,096 A * | 2/1981 | Stock | 293/150 |
| 5,042,858 A * | 8/1991 | Schubert et al. | 293/24 |
| 5,275,436 A | 1/1994 | Pomero | |
| 5,823,587 A * | 10/1998 | Kim | 293/150 |
| 6,511,119 B2 | 1/2003 | Takase et al. | |
| 7,438,151 B2 * | 10/2008 | Winkler | 180/274 |
| 7,478,849 B2 * | 1/2009 | Fortin | 293/120 |
| 7,819,218 B2 | 10/2010 | Eichberger et al. | |
| 8,353,380 B2 | 1/2013 | SchÖnberger et al. | |
| 8,544,589 B1 | 10/2013 | Rupp et al. | |
| 8,660,756 B2 * | 2/2014 | Schrader | 701/45 |
| 2007/0125589 A1 * | 6/2007 | Murphy | 180/274 |
| 2009/0302591 A1 * | 12/2009 | Auer et al. | 280/784 |
| 2011/0133512 A1 * | 6/2011 | Mildner et al. | 296/187.09 |

FOREIGN PATENT DOCUMENTS

| | | |
|---|---|---|
| DE | 102010031089 | 1/2012 |
| DE | 102012004682 | 9/2013 |

\* cited by examiner

*Primary Examiner* — Paul N Dickson
*Assistant Examiner* — Darlene P Condra
(74) *Attorney, Agent, or Firm* — Frank A. MacKenzie; Bejin Bieneman PLC

(57) ABSTRACT

A bumper assembly for a vehicle includes a mounting platform for being fixed relative to a frame of the vehicle. A bumper beam is coupled to the mounting platform. An arm is fixed to the mounting platform at a pivot point and is pivotable about the pivot point to a deflected position for turning a wheel of the vehicle inboard during a small offset frontal impact of the vehicle. The arm orients the wheel with the front portion of the wheel being positioned inboard during the small offset frontal impact. This orientation of the wheel minimizes the magnitude of load transferred to a backup structure of the vehicle and minimizes the possibility of intrusion of the wheel into the floor or dash of the vehicle. In this orientation, the wheel can detach from the vehicle to minimize the possibility of intrusion of the wheel into the floor or dash.

16 Claims, 4 Drawing Sheets

US 9,120,507 B1

SYSTEM FOR ORIENTING FRONT WHEEL OF VEHICLE DURING OFFSET FRONTAL IMPACT

BACKGROUND

During a small offset frontal impact of a vehicle, the impact is offset from major structural components of the vehicle. Offset frontal impacts can be simulated with a small offset rigid barrier (SORB) frontal crash test. For example, the Insurance Institute for Highway Safety (IIHS) sets a standard for a SORB frontal crash test. In a SORB frontal crash test, the vehicle impacts a rigid barrier at 40 miles/hour with 25% of an outer portion of the front of the vehicle overlapping the rigid barrier.

Since the crash contact surface during a small offset frontal impact is offset from major structural components, such as front rails and subframe longitudinal members, these major structural components do not absorb energy effectively during the impact. Instead, the load path of the offset impact travels through a bumper beam to a backup structure behind a wheel of the vehicle. The impact load is directed along this load path and the energy of the impact is absorbed along this load path. The backup structure includes, for example, the floor and dash of the vehicle.

During the small offset frontal impact, the bumper beam moves rearward. The wheel of the vehicle bridges the load path between the bumper beam and the backup structure as the bumper beam moves rearward into the wheel and forces the wheel to move into the backup structure. Since the wheel bridges the load path, the orientation of the wheel affects the load path and the energy absorption during the frontal impact. When the wheel is oriented with a front portion of the wheel being positioned outboard relative to a rear portion of the wheel, the wheel is trapped between the bumper beam and the backup structure and may disadvantageously cause the wheel to intrude into the floor or dash of the vehicle. Intrusion of the wheel into the floor or dash of the vehicle is a metric recorded in the IIHS SORB frontal crash test.

Alternatively, when the wheel is oriented with the front portion of the wheel being positioned inboard relative to the rear portion of the wheel, the wheel can detach from the vehicle, thus minimizing the magnitude of load transferred to the backup structure and minimizing the possibility of intrusion of the wheel into the floor or dash. For example, orientation of the wheel with the front portion of the wheel inboard results in better structural ratings and overall ratings in the IIHS SORB frontal crash test. As such, there remains an opportunity to design a system that orients the wheel with a front portion of the wheel inboard to minimize the magnitude of load transferred to the backup structure and minimize the possibility of intrusion of the wheel into the floor or dash.

DETAILED DESCRIPTION

Figure 1:
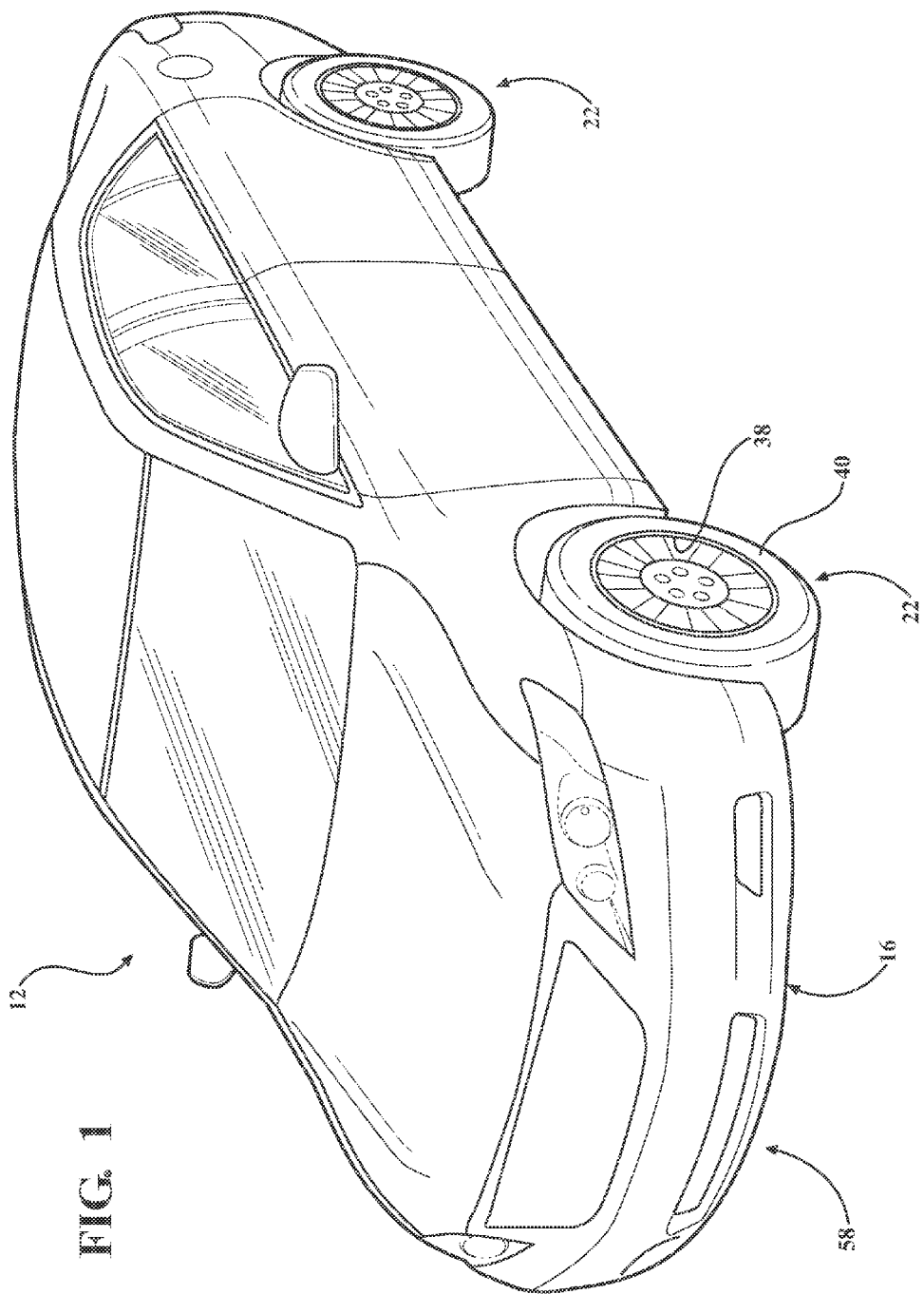
FIG. 1 is a perspective view of a vehicle including a front bumper and a wheel.

With reference to the Figures, wherein like numerals indicate like parts throughout the several views, a small offset frontal impact system 10 for a vehicle 12 includes a vehicle frame 14, a wheel 22 coupled to the frame 14, and a front bumper assembly 34 coupled the to the frame 14. The front bumper assembly 34 includes a front bumper 16 coupled to the frame 14 and an arm 18 disposed between the wheel 22 and the front bumper 16. The arm 18 is fixed to a pivot point 20 and is pivotable about the pivot point 20 between an initial position spaced from the wheel 22, as shown in FIGS. 2 and 3, and a deflected position turning the wheel 22 inboard during a small offset frontal impact, as shown in FIG. 4.

Figure 2:
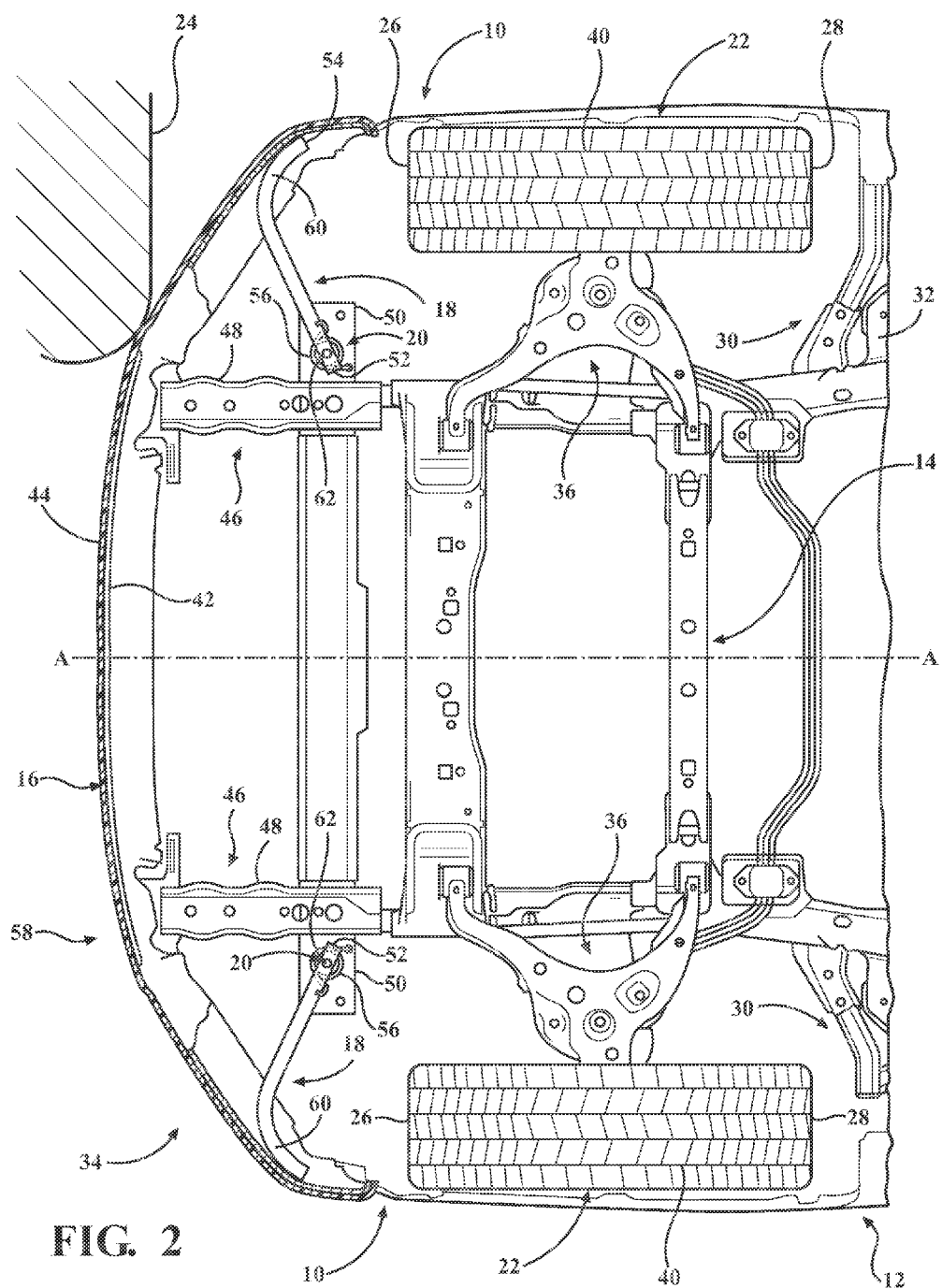
FIG. 2 is a bottom view of a front portion of the vehicle during a small offset rigid barrier (SORB) frontal crash test before a rigid barrier contacts the front bumper.
Figure 3:
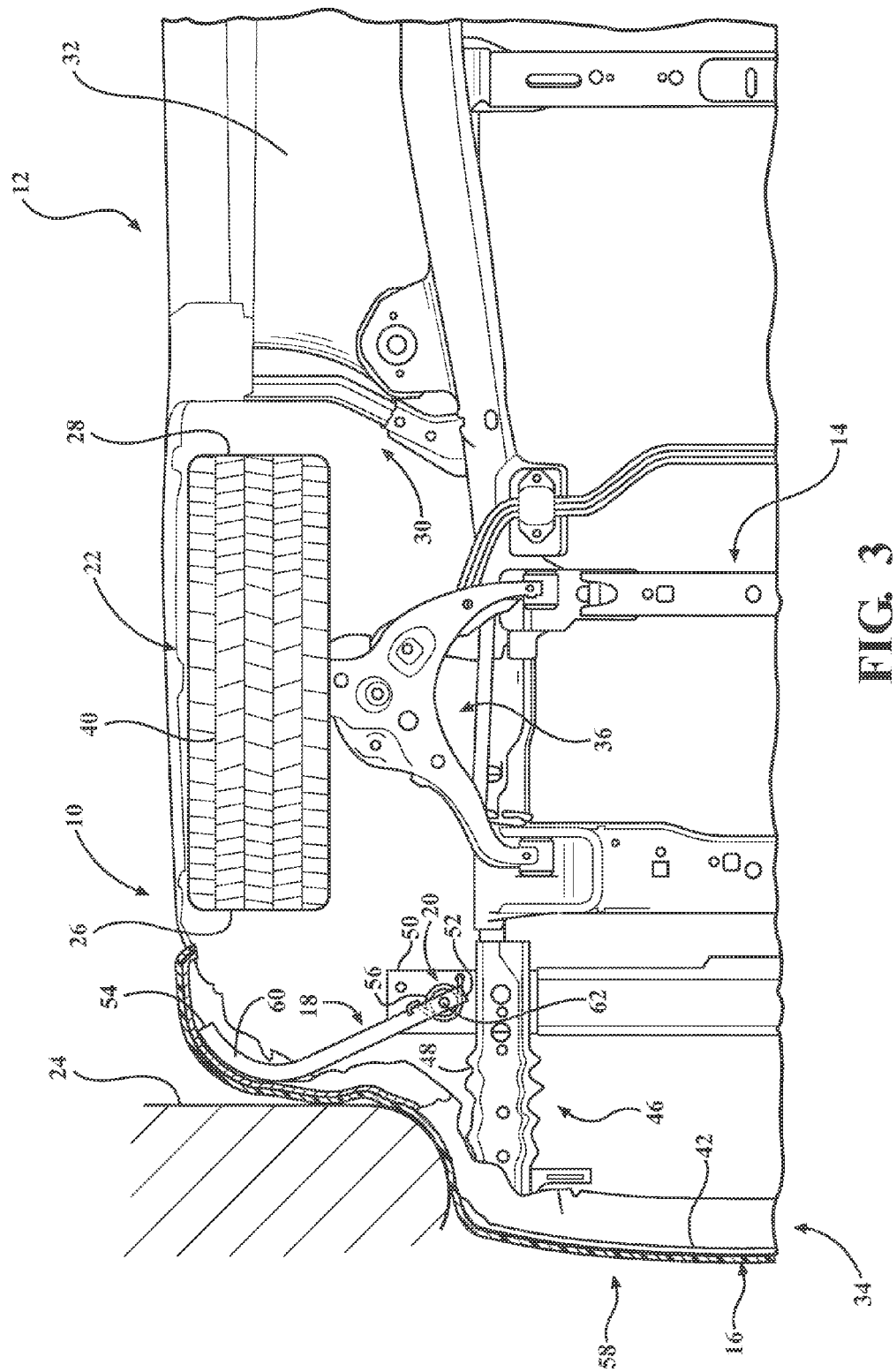
FIG. 3 is a bottom view of the front portion of the vehicle during the SORB frontal crash test when the rigid barrier initially contacts the front bumper.
Figure 4:
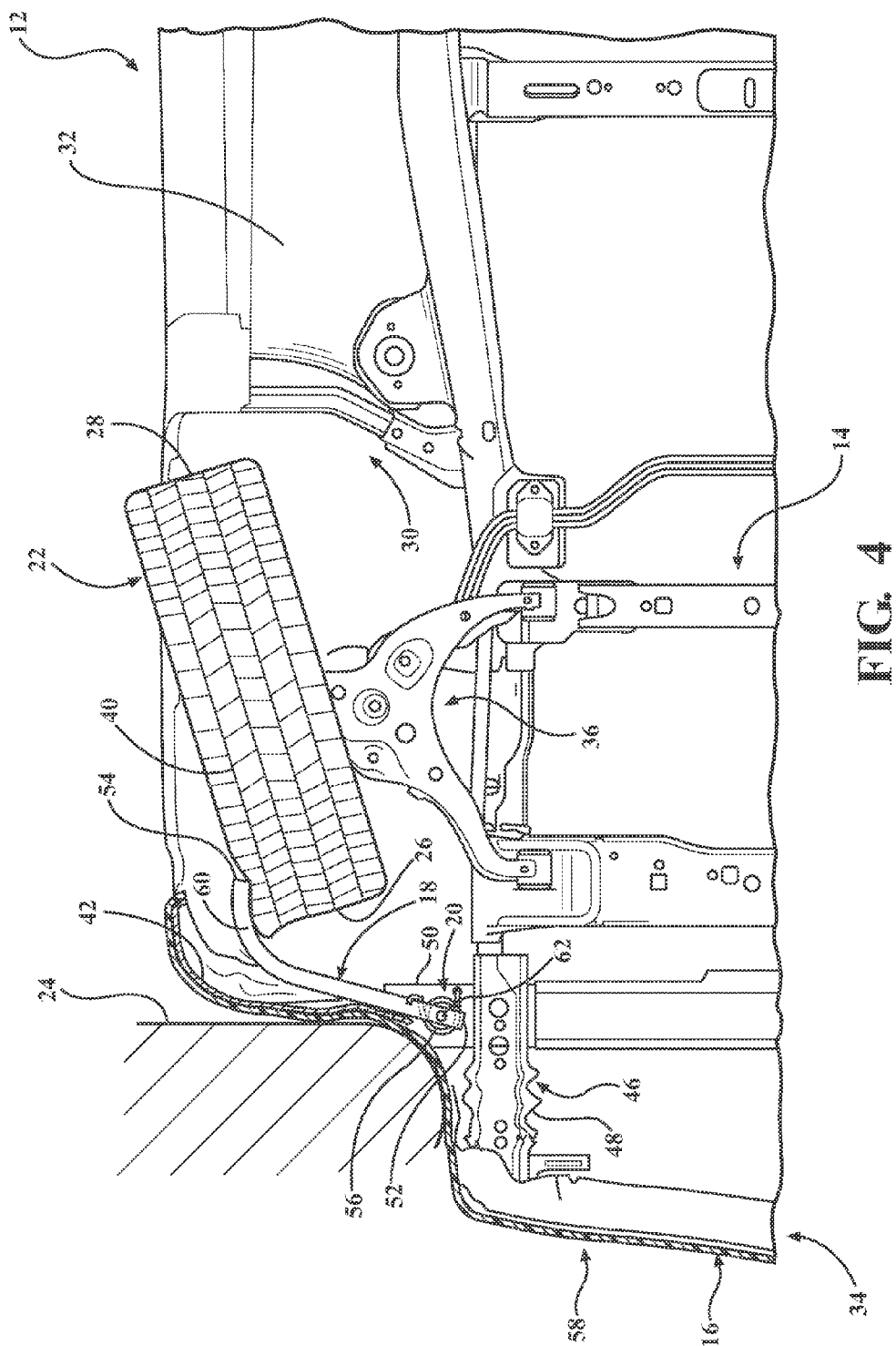
FIG. 4 is a bottom view of the front portion of the vehicle during the SORB frontal crash test when the rigid barrier forces an arm against the wheel to move a front portion of the wheel inboard.

Specifically, during an impact with an object 24, such as the rigid barrier of a SORB frontal crash test shown in FIGS. 2-4, the object 24 moves the arm 18 toward the deflected position. In other words, the arm 18 is passively activated, i.e., activated by impact with the object 24, as opposed to activation by mechanical features, pyrotechnic features, etc. The passive activation reduces the risk of unintended activation. The passive activation design is lightweight, low cost, and reduces development time and cost. The passive activation does not inhibit the structural performance of other impact features during impact modes other than small offset frontal impact.

As the arm 18 moves to the deflected position, the arm 18 orients the wheel 22 such that the front portion 26 of the wheel 22 is positioned inboard relative to the rear portion 28 of the wheel 22 during the small offset frontal impact. In this position, the wheel 22 is oriented to minimize the magnitude of load transferred to a backup structure 30, which includes a floor 32 or dash (not shown) of the vehicle 12, and to minimize the possibility of intrusion of the wheel 22 into a floor 32 or dash of the vehicle 12. In this position, the wheel 22 may also detach from the vehicle 12, which also minimizes the magnitude of load transferred to the backup structure 30 and minimizes the possibility of intrusion of the wheel 22 into the floor 32 or dash. For example, orientation of the wheel 22 with the front portion 26 of the wheel 22 inboard results in better structural ratings and overall ratings in the Insurance Institute of Highway Safety (IIHS) small offset rigid barrier (SORB) frontal impact test.

The frame 14 of the vehicle 12 supports, among other components, the front bumper 16 of the vehicle 12 and the wheel 22 of the vehicle 12. Specifically, the frame 14 supports a steering and suspension system 36 that supports the wheel 22. The frame 14 may be of any type. For example, the frame 14 may be part of a unitary body construction, i.e., uni-body, or may be part of a body-on-frame construction.

The wheel 22 includes a rim 38, typically formed of metal, and a tire 40, typically formed of rubber, disposed on the rim 38. The wheel 22 may be of any type.

The front bumper 16 includes a bumper beam 42. The bumper beam 42 may be formed of metal, such as steel or aluminum, and supports a front fascia 44 of the vehicle 12. The bumper beam 42 may deform during frontal impact, as shown in FIGS. 3 and 4, or alternatively, may remain rigid during frontal impact.

The front bumper 16 includes members 46 that extend from the bumper beam 42 to the frame 14. The members 46 are connected to the frame 14 in any suitable fashion.

An energy absorbing element 48 may be disposed between the bumper beam 42 and the pivot point 20. The energy absorbing element 48 may be, for example, a crush can. The energy absorbing elements 48 collapse during a frontal impact against the bumper beam 42 to absorb energy during the frontal impact.

The pivot point 20 is supported by the frame 14. For example, the pivot point 20 may be disposed on the front bumper 16, as shown in FIGS. 2-4, and, as set forth above, the front bumper 16 is connected to the frame 14. In such a configuration, the arm 18 is pivotally coupled to the front bumper 16. Alternatively, the pivot point 20 may be disposed on the frame 14. In other words, in such a configuration, the arm 18 is pivotally coupled to the frame 14.

A mounting platform 50 may be supported by the frame 14 and presents the pivot point 20. The front bumper 16 shown in FIGS. 2-4, for example, includes the mounting platform 50. The mounting platform 50, for example, may be fixed relative to the member 46 of the front bumper 16 and is coupled to the bumper beam 42 through the member 46. Since the member 46 of the front bumper 16 is fixed to the frame 14, the mounting platform 50 is fixed relative to the frame 14. The mounting platform 50 alternatively, may be fixed to any portion of the front bumper 16. Alternatively, for example, the mounting platform 50 may be fixed to the frame 14. The energy absorbing element 48 may be disposed between the mounting platform 50 and the bumper beam 42.

The arm 18 extends from the pivot point 20 to the front bumper 16 in the initial position. For example, as shown in FIG. 2, the arm 18 may extend to the bumper beam 42. Alternatively, the arm 18 may extend to the fascia 44 in a different bumper beam 42/fascia 44 design.

The arm 18 extends from a first end 52 at the pivot point 20 to a second end 54 at the bumper beam 42. The first end 52 is pivotally coupled and translationally fixed to the pivot point 20. In other words, the connection of the arm 18 at the pivot point 20 prevents translational movement of the arm 18 relative to the pivot point 20 and restrains relative movement between the arm 18 relative and the pivot point 20 to pivoting movement.

The second end 54 of the arm 18, for example, abuts the bumper beam 42 as shown in FIGS. 2-4. The arm 18 may be cantilevered from the pivot point 20. In other words, the arm 18 may be free, i.e., unsupported, at the second end 54.

Alternatively, the second end 54 of the arm 18 may be connected to the bumper beam 42. For example, the arm 18 may be tack welded to the bumper beam 42, supported on a supporting or locking feature of the bumper beam 42, etc. In a configuration with the second end 54 of the arm 18 connected to the bumper beam 42, the connection between the second end 54 and the bumper beam 42 may be frangible such that the connection is broken during a frontal impact, e.g., when the bumper beam 42 moves relative to the frame 14.

A spring 56 is disposed between the pivot point 20 and the arm 18. The spring 56 biases the arm 18 toward the initial position, as shown in FIGS. 2 and 3. The spring 56 may be, for example, a torsional spring, as shown in FIGS. 2-4. Alternatively, the spring 56 may be of any suitable type. The spring 56 may be resilient or may permanently deform during rotation of the arm 18 about the pivot point 20.

The arm 18 extends from the pivot point 20 in a direction away from the wheel 22 in the initial position. In other words, the arm 18 extends forwardly toward a front 58 of the vehicle 12 and outwardly relative to a center axis A of the vehicle 12. The pivot point 20 may be disposed forwardly relative to the wheel 22, as shown in FIGS. 2-4. This configuration provides the earliest engagement between the object 24 and the arm 18 during a small offset frontal impact.

The arm 18 presents a hook 60. The hook 60 is disposed at the second end 54 of the arm 18. The hook 60 is configured to trap the wheel 22 between the hook 60 and the pivot point 20 when the arm 18 is in the deflected position, as shown in FIG. 4.

Specifically, the hook 60 is disposed at a distance from the pivot point 20 such that the hook 60 forces the front portion 26 of the wheel 22 inboard relative to the vehicle 12 when the arm 18 moves to the deflected position. In other words, the hook 60 may be positioned such that the hook 60 initially engages an outer portion of the wheel 22 in the deflected position and forces the front portion 26 of the wheel 22 inboard as the hook 60 continues to pivot about the pivot point 20.

The geometry of the arm 18, for example, the geometry of the hook 60 is configured to engage the wheel 22 at a desired location and at a desired time to initiate the rotational pattern of the wheel 22 to move the front portion 26 of the wheel 22 inboard. The arm 18 may remain rigid during the small offset frontal impact, as shown in FIGS. 3 and 4. Alternatively, the arm 18 may deform during the small offset frontal impact. For example, the hook 60 may deform during the small offset frontal impact.

The arm 18 may be configured to contact the wheel 22 in the deflected position, as shown in FIG. 4. Alternatively, the arm 18 may be configured to indirectly engage the wheel 22 in the deflected position, e.g., through one or more intermediate components (not shown).

The pivot point 20 may include a pin 62 that engages the arm 18. The arm 18 pivots about the pin 62 between the initial position and the deflected position, as shown in FIGS. 2-4. The pin 62 extends between the arm 18 and the mounting platform 50. The mounting platform 50 and the arm 18, for example, each define a hole (not numbered) that receives the pin 62. The spring 56 may, for example, extend about the pin 62 between the mounting platform 50 and the arm 18 to bias the arm 18 toward the initial position. In such a configuration, the spring 56 may be a torsional spring 56, as set forth above.

The operation of the arm 18 during a small offset frontal impact is shown in FIGS. 2-4. As shown in FIG. 2, prior to the small offset frontal impact, the arm 18 is disposed in the initial position. As set forth above, the arm 18 may be biased against the bumper beam 42 in the initial position by the spring 56.

During the offset impact, the object 24, e.g., a rigid barrier in a SORB frontal crash test shown in FIGS. 2-4, impacts the front bumper 16. As shown in FIG. 3, during the impact, the object 24 deforms the bumper beam 42 and crushes the energy absorbing device. The bumper beam 42 and the energy absorbing element 48 can deform before the arm 18 is activated, as shown in FIG. 3.

With reference to FIG. 4, as the object 24 continues to deform the bumper beam 42, the object 24 forces the arm 18 toward the wheel 22. As the arm 18 approaches the wheel 22, the hook 60 engages the wheel 22 and turns the front portion 26 of the wheel 22 inboard. As set forth above, in this position, the wheel 22 is positioned to minimize magnitude of load transferred to the backup structure 30 and to minimize the possibility of intrusion of the wheel 22 into the floor 32 or dash of the vehicle 12. In this position, the wheel 22 can detach from the vehicle 12 during the small offset frontal impact.

The disclosure has been provided in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system for a vehicle, the system comprising:
a frame;
a wheel coupled to the frame;

a front bumper coupled to the frame;

an arm disposed between the wheel and the front bumper, the arm being fixed to a pivot point and being pivotable about the pivot point between an initial position spaced from the wheel and a deflected position turning the wheel inboard during a small offset frontal impact; and a bumper beam with the arm extending from the pivot point to the bumper beam in the initial position.

2. The system as set forth in claim 1 further comprising a spring disposed between the pivot point and the arm and biasing the arm toward the initial position.

3. The system as set forth in claim 1 wherein the arm extends from the pivot point in a direction away from the wheel in the initial position.

4. The system as set forth in claim 1 further comprising an energy absorbing element between the bumper beam and the pivot point.

5. The system as set forth in claim 1 wherein the arm extends from the pivot point in a direction away from the wheel in the initial position.

6. The system as set forth in claim 1 wherein the arm presents a hook configured to trap the wheel between the hook and the pivot point when the arm is in the deflected position.

7. The system as set forth in claim 1 wherein the pivot point is supported by the frame.

8. The system as set forth in claim 1 wherein the pivot point includes a pin that engages the arm and the arm pivots about the pin between the initial position and the deflected position.

9. A front bumper assembly for a vehicle, the front bumper comprising:

a mounting platform for being fixed relative to a frame of the vehicle;

a bumper beam coupled to the mounting platform;

an arm fixed to the mounting platform at a pivot point and being pivotable about the pivot point to a deflected position for turning a wheel of the vehicle inboard during a small offset frontal impact of the vehicle; and wherein the arm extends from the pivot point to the bumper beam in the initial position.

10. The front bumper assembly as set forth in claim 9 further comprising a spring disposed between the pivot point and the arm and biasing the arm toward the initial position.

11. The front bumper assembly as set forth in claim 9 further comprising an energy absorbing element between the bumper beam and the pivot point.

12. The front bumper assembly as set forth in claim 9 wherein the arm presents a hook configured to trap the wheel between the hook and the pivot point when the arm is in the deflected position.

13. The front bumper assembly as set forth in claim 9 wherein the mounting platform is supported by the frame.

14. The front bumper assembly as set forth in claim 9 wherein the pivot point includes a pin extending between the arm and the mounting platform and the arm pivots about the pin to the deflected position.

15. The front bumper assembly as set forth in claim 9 further comprising a fascia at least partially covering the bumper beam.

16. The front bumper assembly as set forth in claim 15 wherein the arm extends from the pivot point to the fascia in the initial position.

* * * * *